United States Patent [19]
Jens et al.

[11] Patent Number: 6,039,556
[45] Date of Patent: *Mar. 21, 2000

[54] STACKABLE MOLD PLATES HAVING ARRAYS OF LASER-CUT MOLD SURFACES AT THEIR EDGES

[75] Inventors: Stephen C. Jens, Winchester; Andrew C. Harvey, Waltham; Richard M. Formato, Shrewsbury, all of Mass.

[73] Assignee: Velcro Industries B.V., Curacao, Netherlands Antilles

[*] Notice: This patent issued on a continued prosecution application filed under 37 CFR 1.53(d), and is subject to the twenty year patent term provisions of 35 U.S.C. 154(a)(2).

[21] Appl. No.: 08/926,517

[22] Filed: Sep. 10, 1997

Related U.S. Application Data

[63] Continuation-in-part of application No. 08/786,226, Jan. 21, 1997.

[51] Int. Cl.$^7$ ............................. B29C 33/42; B29C 43/46
[52] U.S. Cl. ............................. 425/363; 24/442; 24/452; 425/470; 425/471; 425/814
[58] Field of Search ................................ 425/113, 192 R, 425/194, 237, 363, 814, 470, 471; 24/442, 452

[56] References Cited

U.S. PATENT DOCUMENTS

| | | |
|---|---|---|
| 3,027,595 | 4/1962 | Takai et al. . |
| 3,089,191 | 5/1963 | Conrad . |
| 3,312,583 | 4/1967 | Rochlis . |
| 3,555,601 | 1/1971 | Price . |
| 3,752,619 | 8/1973 | Menzin et al. . |
| 3,907,486 | 9/1975 | Kennedy . |
| 4,261,692 | 4/1981 | Kuby . |
| 4,573,893 | 3/1986 | Waters et al. ........................ 425/378.1 |
| 4,587,700 | 5/1986 | Curbishley et al. . |
| 4,725,221 | 2/1988 | Blanz ..................................... 425/814 |
| 4,775,310 | 10/1988 | Fischer ................................... 425/814 |
| 4,794,028 | 12/1988 | Fischer . |
| 5,174,937 | 12/1992 | Tamura et al. . |
| 5,705,254 | 1/1998 | Morinaga et al. . |

OTHER PUBLICATIONS

International Search Report for PCT/US98/01503 mailed Jun. 1, 1998 (6 pp).

*Primary Examiner*—James P. Mackey
*Attorney, Agent, or Firm*—Fish & Richardson P.C.

[57] ABSTRACT

Molding apparatus and method for molding of features integral with a base, such as in the production of fastener elements for hook-and-loop type touch fasteners, e.g. by the Fischer process, employs a mold roll formed of rings that have coolant passages formed within the ring components themselves for substantially direct contact with cooling liquid. Axial tie rods compress the mold rings together, contributing to the sealing of the coolant passages and the stiffness of the mold roll. Other types of sealing are disclosed. Mold cavities, including cavities used for injection molding, and cooling passages formed in either mold rings or injection mold plates by photo-chemical etching, laser machining and other techniques are disclosed. Various machines and methods taking unique advantage of these features are disclosed, including ring alignment methods.

19 Claims, 17 Drawing Sheets

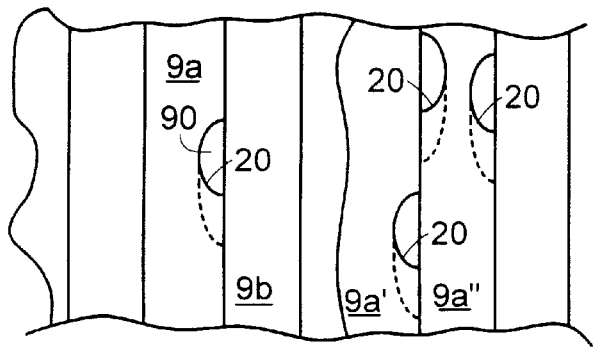 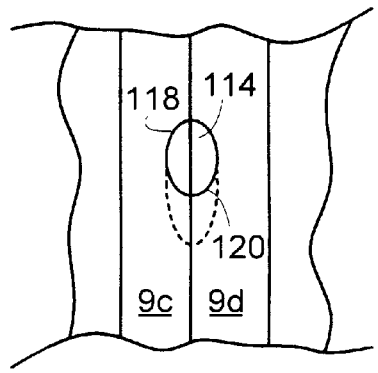
FIG. 17A  FIG. 17B
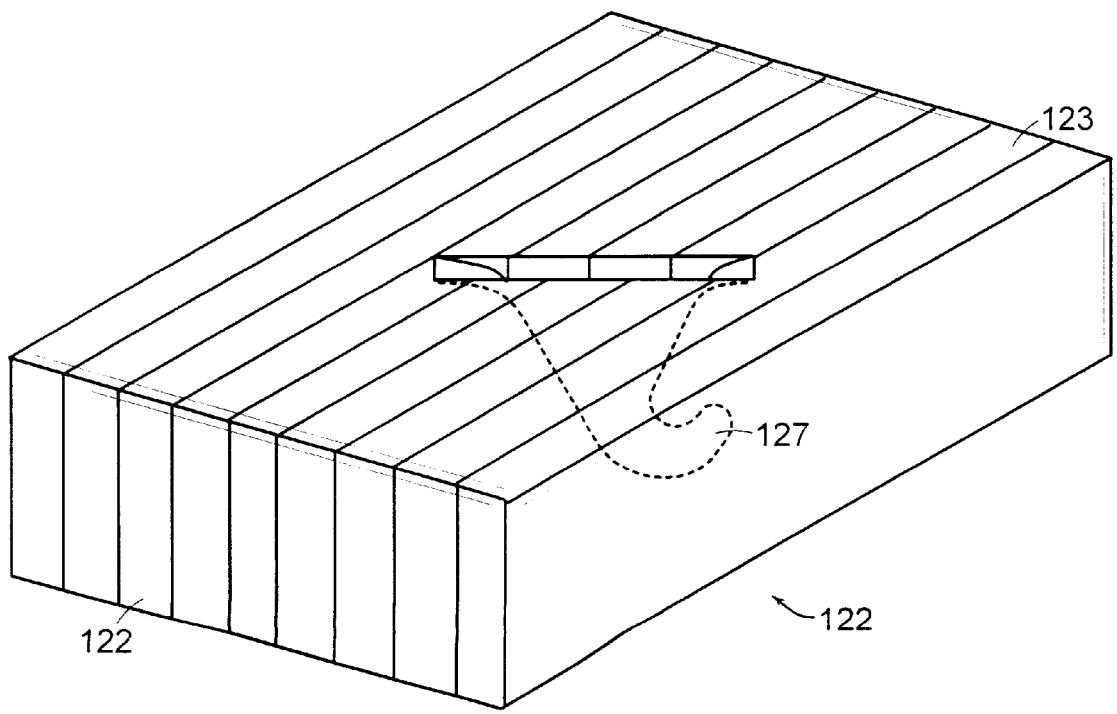
FIG. 18

STACKABLE MOLD PLATES HAVING ARRAYS OF LASER-CUT MOLD SURFACES AT THEIR EDGES

CROSS REFERENCE TO RELATED APPLICATION

This application is a continuation-in-part of copending U.S. Ser. No. 08/786,226, filed Jan. 21, 1997.

BACKGROUND OF THE INVENTION

This invention relates to molding of synthetic resin to produce features that are integral with a base, and has particular application to the production of fastener elements for touch fasteners and the like.

Hook elements for hook-and-loop touch fasteners and other products are effectively produced by the machine and method of Fischer U.S. Pat. No. 4,794,028. In commercial production, a mold roll is formed by a large number of thin, disk-shaped mold rings (sometimes called mold plates) and spacer rings which are stacked concentrically about a central barrel.

Discrete products are also injection molded with fastener elements extending from a base surface by employing, as part of the mold, a series of stacked mold plates defining an array of mold cavities.

At the periphery of the mold rings or mold plates are cavities for molding the hook elements. In current production machines each cavity of a mold ring has been formed, one at a time, by wire electro-discharge machining (EDM). In the wire EDM process, an electrical discharge between a wire and the plate removes material From the plate while the wire is moved along a specified path to cut a profile through the mold plate. The minimum radius arc that can be cut is determined by the radius of the EDM wire.

Molten resin is forced into the mold cavities, tending to raise the temperature of the mold rings. In practice of the Fischer method, a fluid coolant is circulated through cooling passages within the barrel on which the rings are mounted to remove the heat from the rings. In this way an appropriate temperature of the mold cavities is maintained so that the product becomes sufficiently solid that it can be withdrawn on a continuous basis, typically without opening the mold cavities.

SUMMARY OF INVENTION

Given the large capital costs of the equipment and the need to form improved products, it is desirable to find improvements for implementing the Fischer machine and for molding very small fastener elements.

We have also realized that cavities for molding fastener elements, especially fastener elements with small features (e.g., hooks with sharp tips), may be formed by laser cutting methods. According to one aspect of the invention, a method of making a mold with fastener element-shaped cavities is provided. The method includes forming mold plates from flat plate stock by laser-cutting each plate to form an array of mold surfaces that extend inwardly from an edge of the mold plate for defining respective fastener element-shaped cavities.

Certain preferred embodiments of the method of the invention include: stacking the mold plates with their edges aligned to form a surface of a mold having rows of fastener-shaped mold cavities; laser-cutting coolant holes through the thickness of the plates at locations spaced from their edges; preferably, aligning the holes during the stacking to form coolant passages.

In some cases the mold includes round mold plates with laser-cut outer edges; preferably, the mold plates are axially stacked to form a mold roll. In some other cases, the mold defines a closeable and openable mold cavity for injection-molding of part.

In certain preferred embodiments, the mold surfaces define fastener element features having end radii of less than about 0.001 inch; preferably, less than about 0.0005 inch.

In a particularly preferred embodiment, at some of the fastener-shaped mold cavities are formed by the mold surfaces of two or more adjacent, stacked mold plates.

In certain embodiments, the laser-cutting is controlled to produce mold surfaces extending through only a portion of the thickness of their respective mold plates; preferably, the mold surfaces are concave. In other embodiments, at least some of the mold surfaces extend through their respective mold plates; preferably, these surfaces are generally parallel to the surface of the mold.

For greater efficiency, the mold surfaces of a plurality of mold plates can be simultaneously formed by laser-cutting.

In some cases, forming the mold plates include, after laser-cutting the mold surfaces, smoothing the mold surfaces, such as immersion in a chemical etchant.

According to another aspect, the invention provides a mold plate produced by laser-cutting, having any number of the features heretofore described with respect to the method of the invention.

The invention may provide one or more advantages. For example, the invention is particularly suitable for forming small fastener elements (e.g., elements having an overall height smaller than 0.020 inch) with extremely small tip radii (e.g., less than 0.001 inch). The outer edge of a mold plate and the mold surfaces around the edge can be simultaneously formed. Mold plates can thus be cost-effectively produced with accurately-formed mold surfaces.

Figure 11:
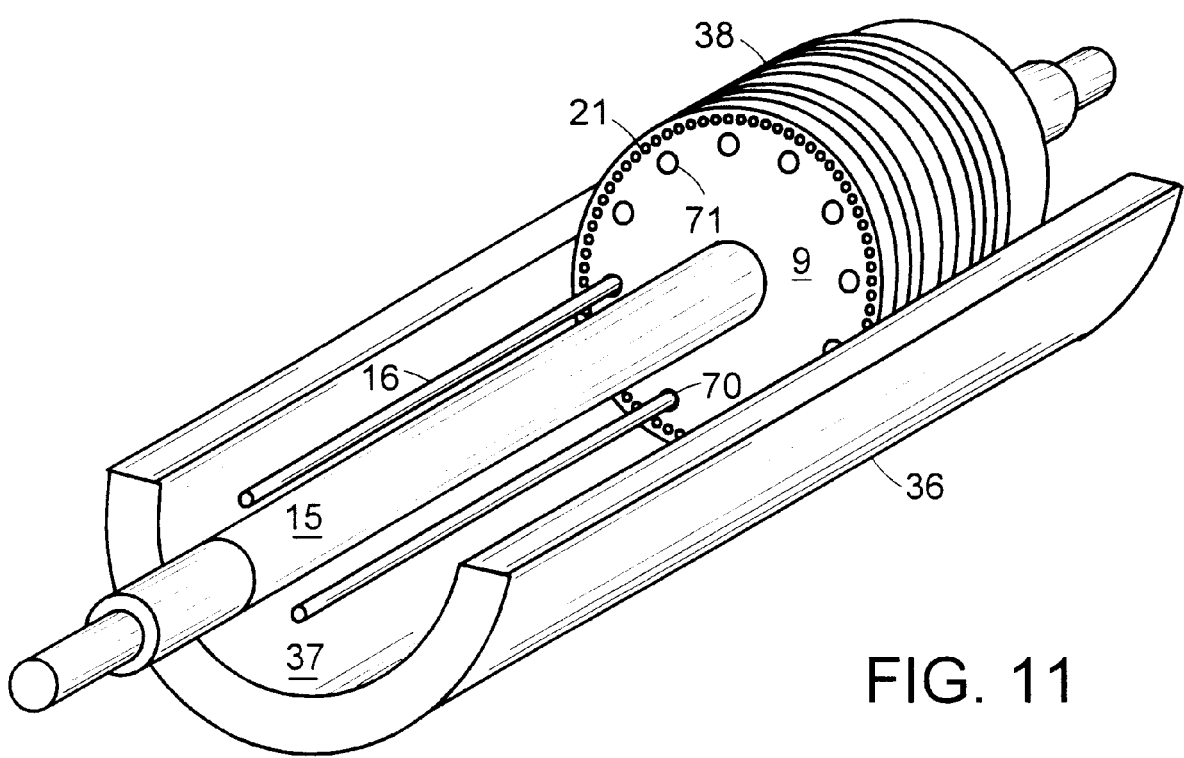
Figure 12:
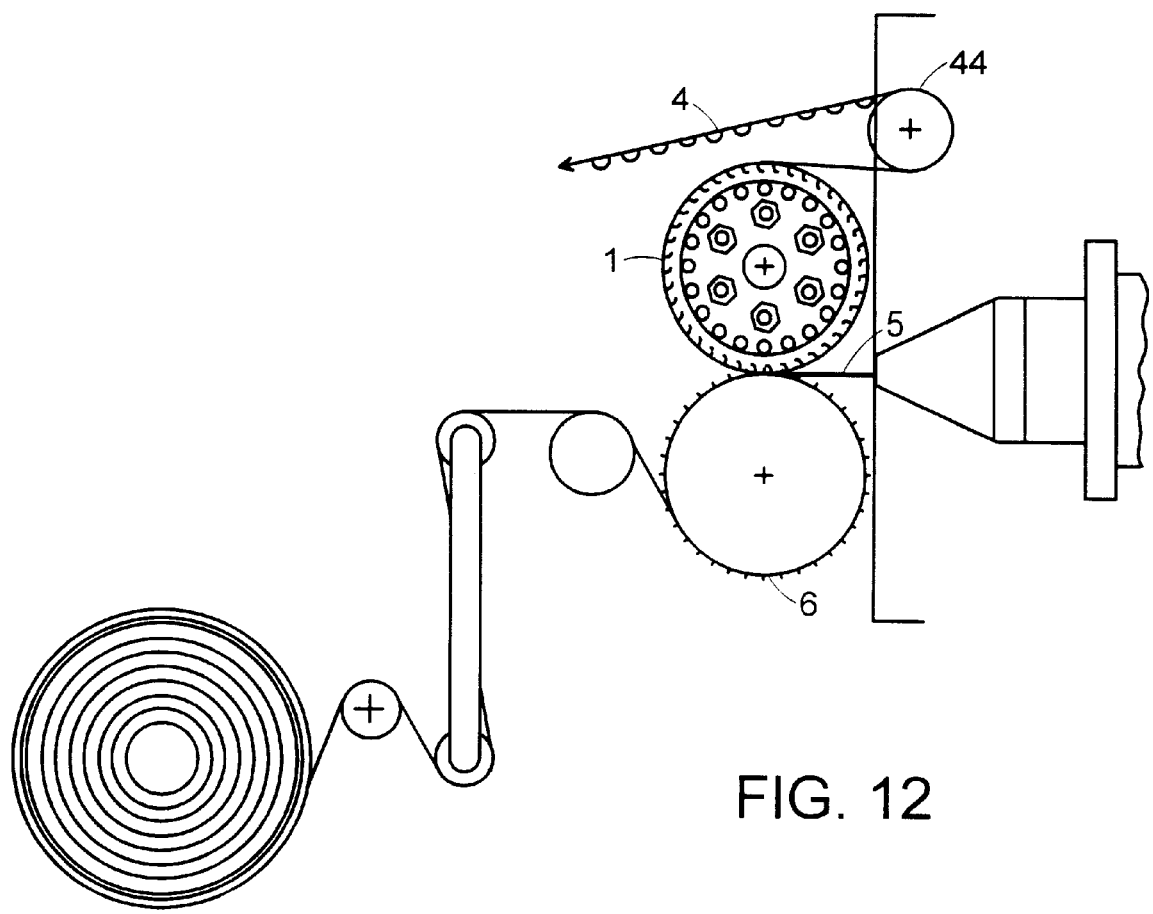
Figure 13:
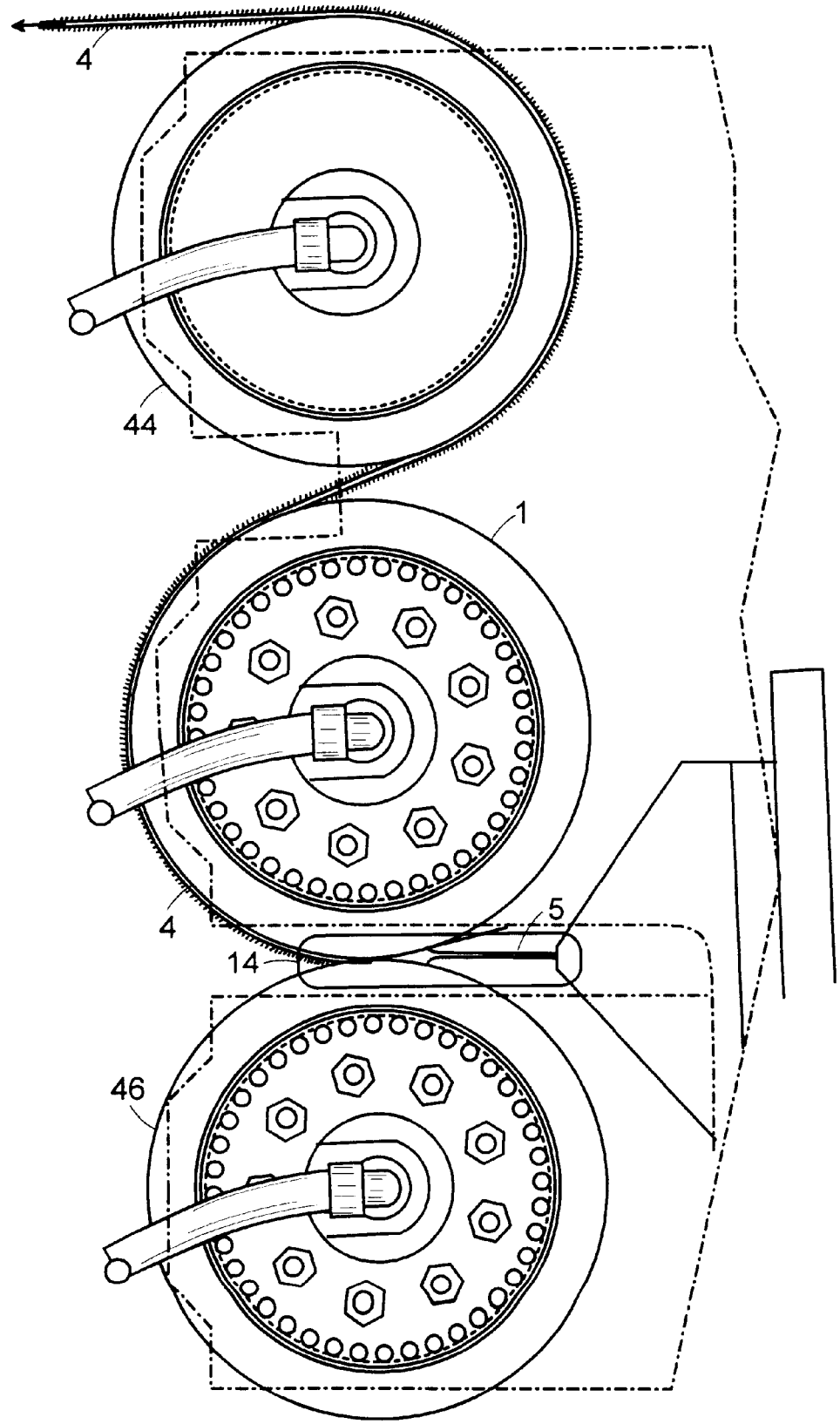
Figure 14:
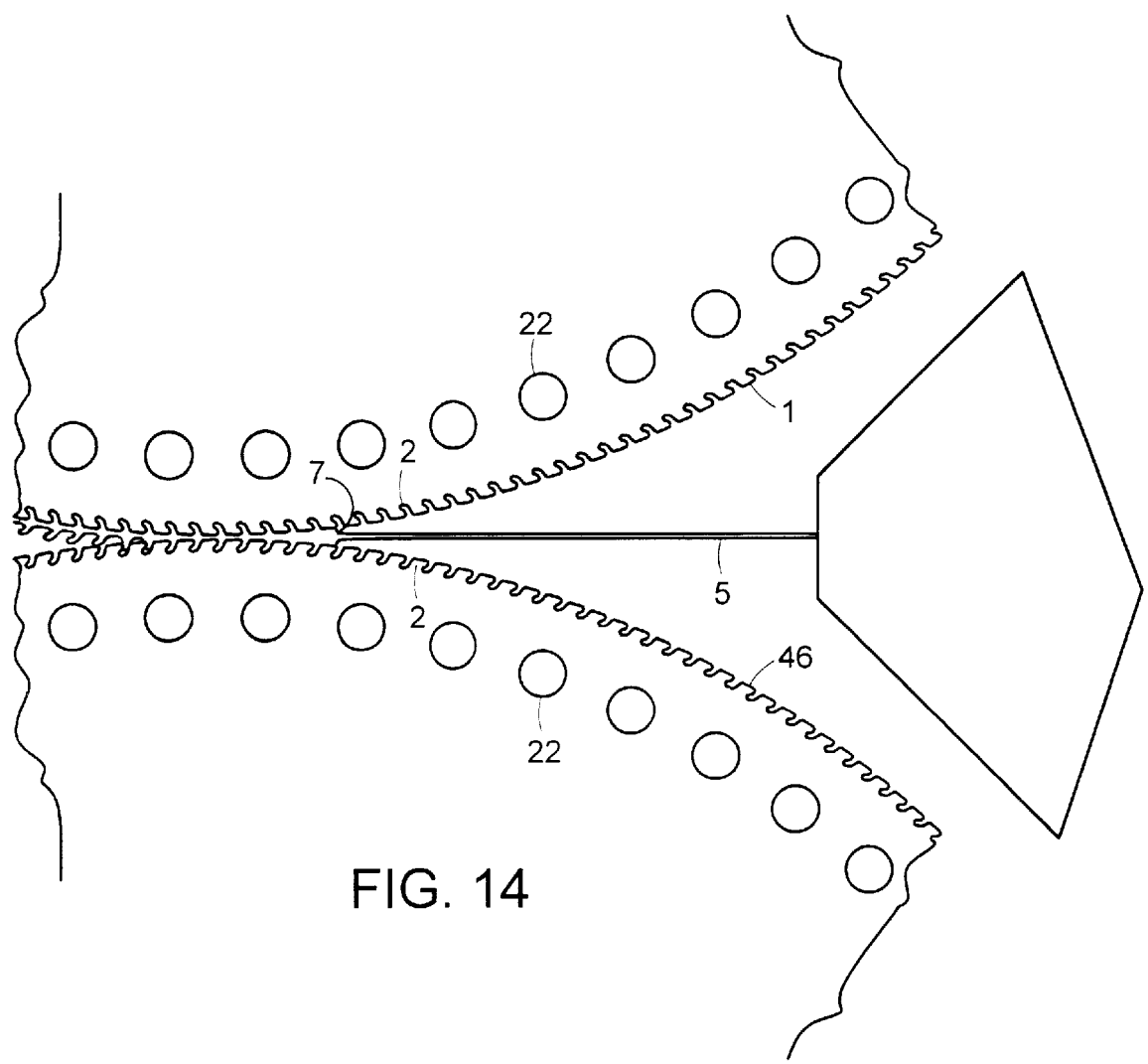

FIGS: 10A and 10B illustrate preferred methods of ring manufacture;

FIG. 11 illustrates a method for aligning and assembling the mold roll;

FIGS. 12 and 13 illustrate machines and methods for making various fastener products utilizing the mold roll;

FIG. 14 is an enlarged view of area 14 in FIG. 13.

Figure 15A:
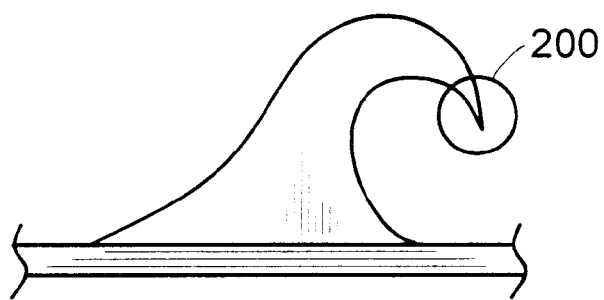
Figure 15B:
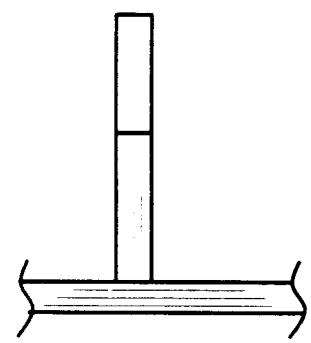
Figure 15C:
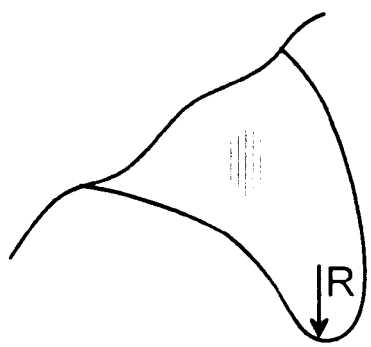
Figure 16A:
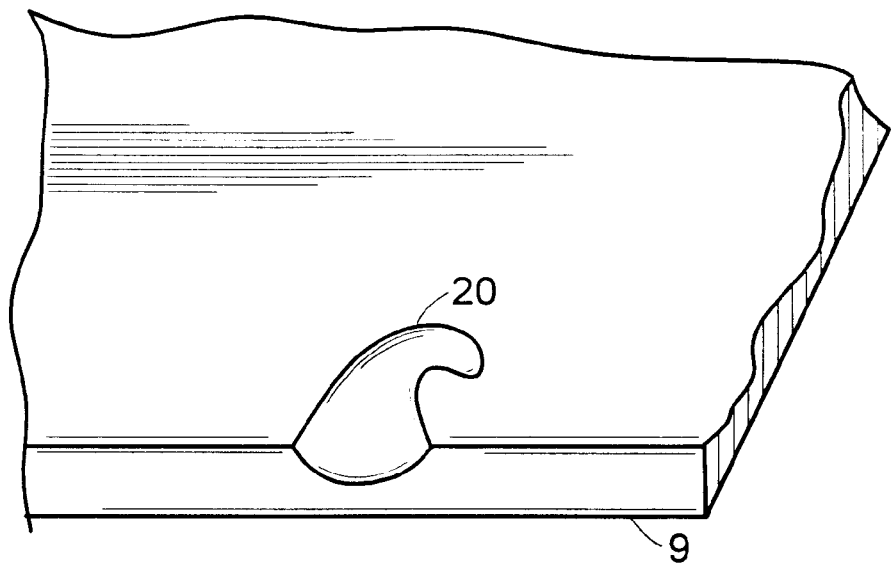
Figure 16B:
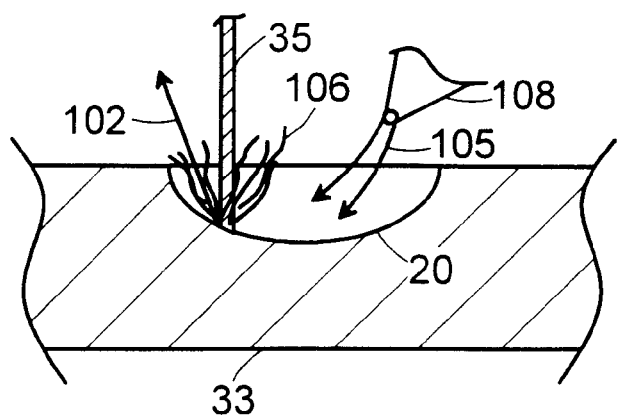

FIG. 15A is a side view of a molded fastener element with a sharp tip;

FIG. 15B is a front view of the fastener element of FIG. 15A;

FIG. 15C is a close-up view of area 200 of FIG. 15A;

FIG. 16A is a perspective view of a concave mold surface;

FIG. 16B is a side cross-sectional view of laser machining the mold surface of FIG. 16A;

FIG. 17A is an edge view of adjacent mold plates forming a mold cavity with a curved mold surface and an opposing plate side surface;

FIG. 17B is an edge view of mold plates forming a mold cavity with two opposing, curved mold surfaces; and FIG. 18 is a perspective view of an injection mold showing the orientation of a mold cavity diagrammatically.

DESCRIPTION OF THE PREFERRED EMBODIMENTS

FIGS. 1–14 illustrate equipment useful for the continuous molding of synthetic resin to produce features that are integral with a base sheet, having particular application to the production of fastener elements for touch fasteners and the like.

Figure 1:
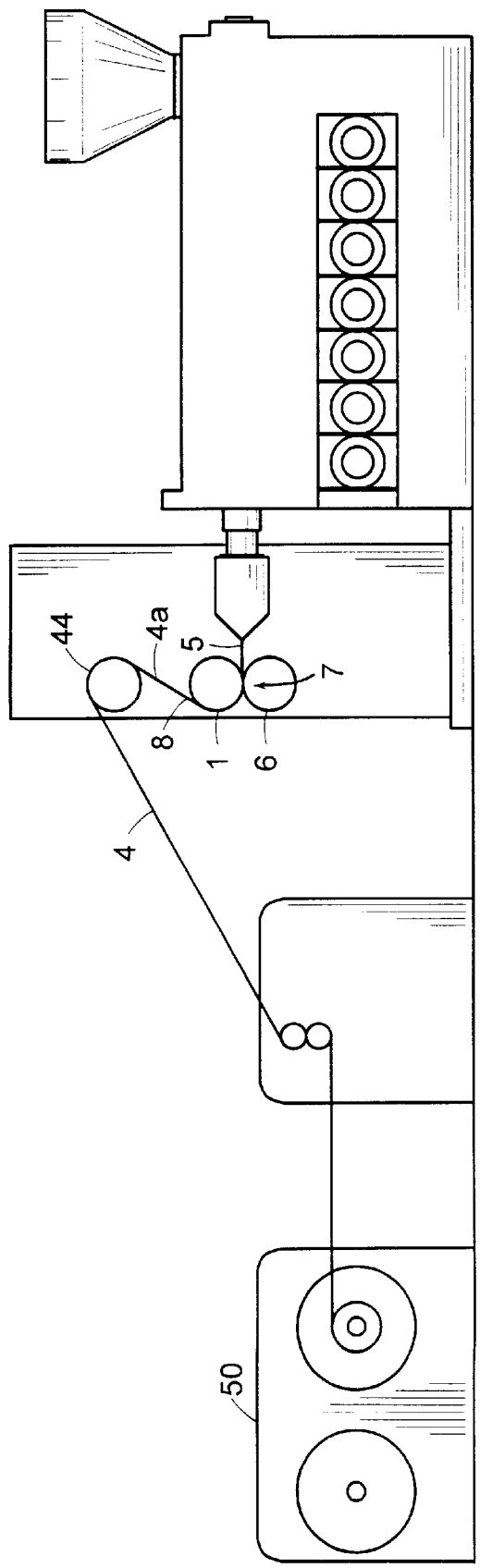
FIG. 1 is a schematic representation of a molding system employing a mold roll.

FIG. 1 shows a molding system using the molding roll for the production of hook elements for touch fastener products. The process and basic machine shown are in accordance with the Fischer techniques as described in U.S. Pat. Nos. 4,775,310, 4,794,028 and 4,872,243, which are hereby incorporated by reference as if they were fully set forth.

The mold roll 1 has miniature hook form mold cavities around its periphery for forming hook projections on an extruded strip-form touch fastener product 4. Mold roll 1 comprises many annular, thin mold rings, for instance of 0.006 to 0.020 inch thickness, held together as a stack. Heat-softened synthetic resin 5 is forced into the cavities under pressure. In a continuous process, the hook-form projections at least partially solidify in the mold cavities, and are then pulled out of the cavities in area 8 after the product has cooled to a temperature at which the projections have solidified sufficiently to be pulled intact out of their mold cavities, remaining integral with the base sheet of the product. The projections are pulled out of mold roll 1 by passing the product around an idler roll 44, and from there to the takeup assembly 50.

Figure 2:
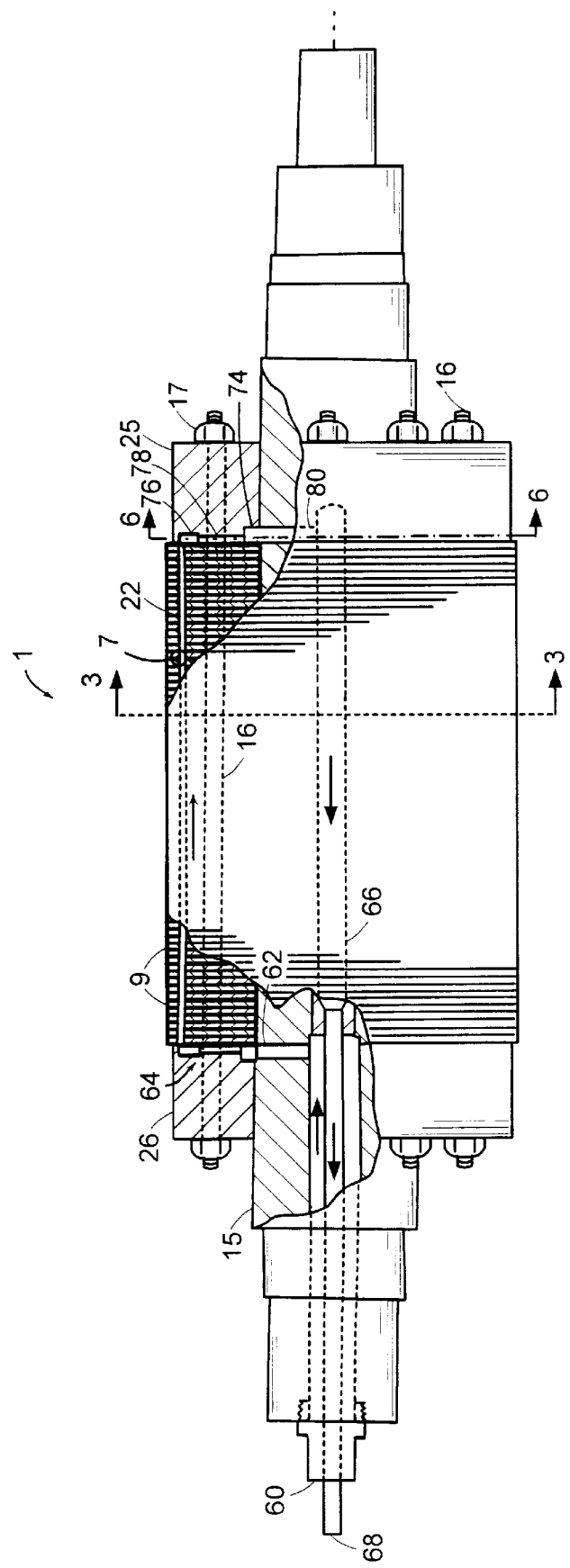
FIG. 2 is a fragmentary view of a mold roll, according to the invention.

FIG. 2 illustrates improvements to mold roll 1 of FIG. 1. We have realized that substantial axial compression of mold roll 1 near its periphery, as produced by the structure shown in FIG. 2, will so reduce bending deflection of mold roll 1 during the molding process that advantages are obtained. The transverse load applied to the mold roll by the pressure roll 6 (FIG. 1), or by other means for applying resin under pressure, tends to cause mold roll 1 to bend, which can result in uneven product thickness. Stiffening mold roll 1 in the manner shown in FIG. 2 facilitates the production of product 4 with a desirably thinner base, and also enables the use of longer mold rolls 1, producing desirably wider products 4.

The individual mold rings 9 of mold roll 1 are aligned and stacked axially around a common shaft 15. Rings 9 are held together under axial compression by an array of tie rods 16 extending through aligned holes in the stack of rings, running parallel to shaft 15 and tensioned by threaded nuts 17 at each end.

An array of many coolant passages 22 pass through mold roll 1 near the periphery of mold rings 9 for improved cooling of the mold cavities at the periphery of the mold roll.

In the presently preferred configuration, cooling fluid is pumped into the mold roll through an annular inlet 60 in shaft 15, and passes through shaft holes 62 and passages 64 of an inlet manifold 26. From the inlet manifold, the coolant passes through the mold roll along cooling passages 22 to an outlet manifold 25 at the other end of the mold roll, which also has passages 64 to direct the coolant through shaft holes 65 and a return passage 66 in shaft 15, to outlet 68.

Figure 3:
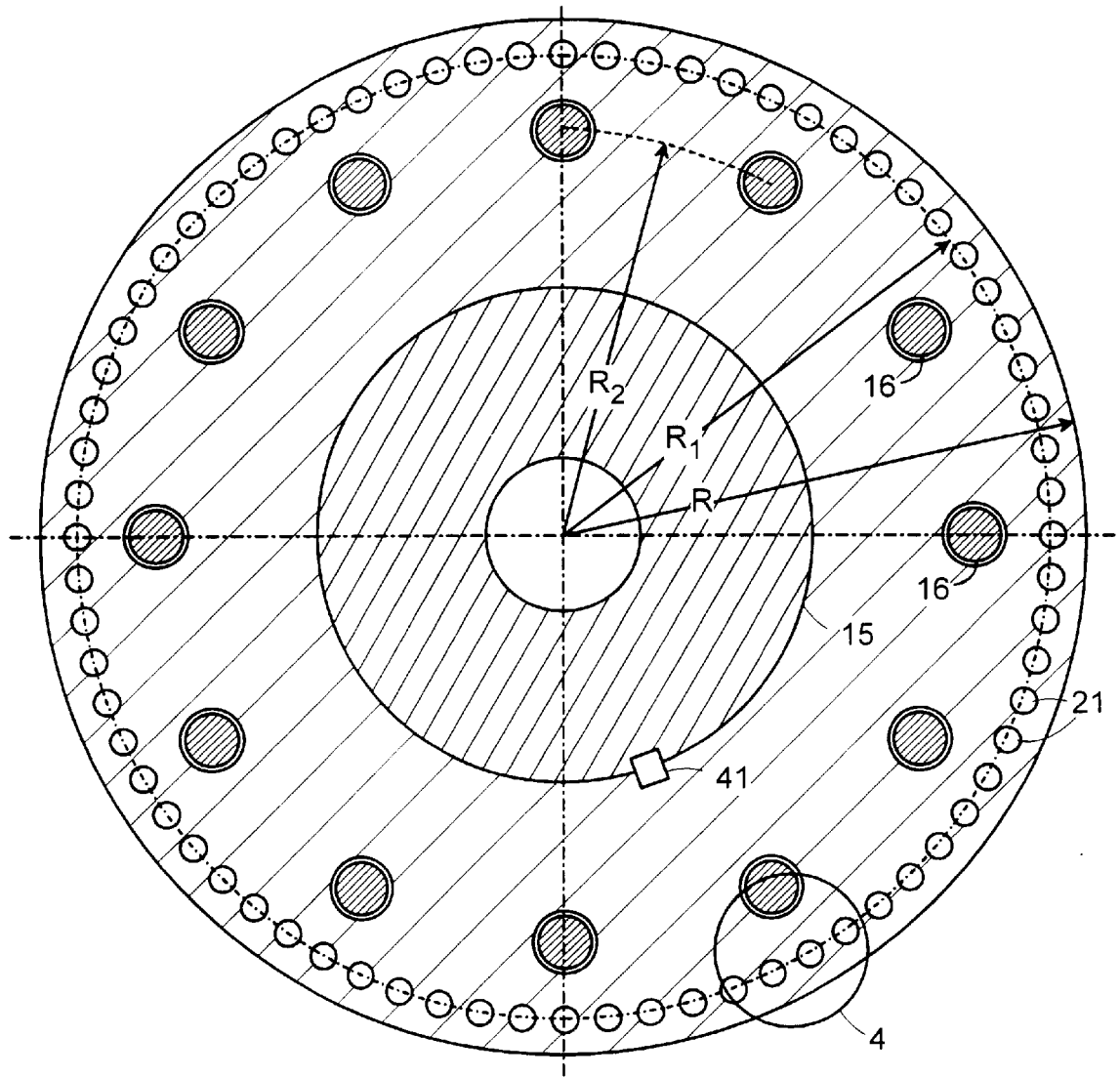
FIG. 3 is an enlarged cross-sectional view, taken along line 3—3 in FIG. 2.

FIG. 3 is a cross-sectional view of the mold roll 1 of Radius R, showing the arrangement of tie rods 16 around shaft 15. In one embodiment, a circular array of eight one-inch diameter tie rods within about 2 to 3 inches of the periphery of a roll of radius R of 5.0 inch, on a bolt circle of radius $R_2$ of 3.8 inch, each tightened to establish substantial preload tension, enable axial compression of the mold roll such as to provide advantageous bending resistance. An array of many, relatively small coolant holes 21 are also seen near the periphery of the mold ring at radius $R_1$. The coolant holes 21 in each ring are aligned to form the cooling passages 22 extending through the assembled mold roll 1 (FIG. 2). For a mold roll radius R of about 5.0 inches, an array of about 60 one-quarter inch diameter coolant holes, arrayed on a radius $R_1$ of about 4.75 inches, provide improved temperature consistency around the mold roll. The axial compression of the mold roll by the tensioned tie rods 16 establishes a degree of thermal contact between the faces of the rings and serves to keep liquid coolant within coolant holes 21 from leaking between mold rings 9. A key 41 is employed to transfer driving torque from shaft 15 to the stacked mold rings.

Figure 4:
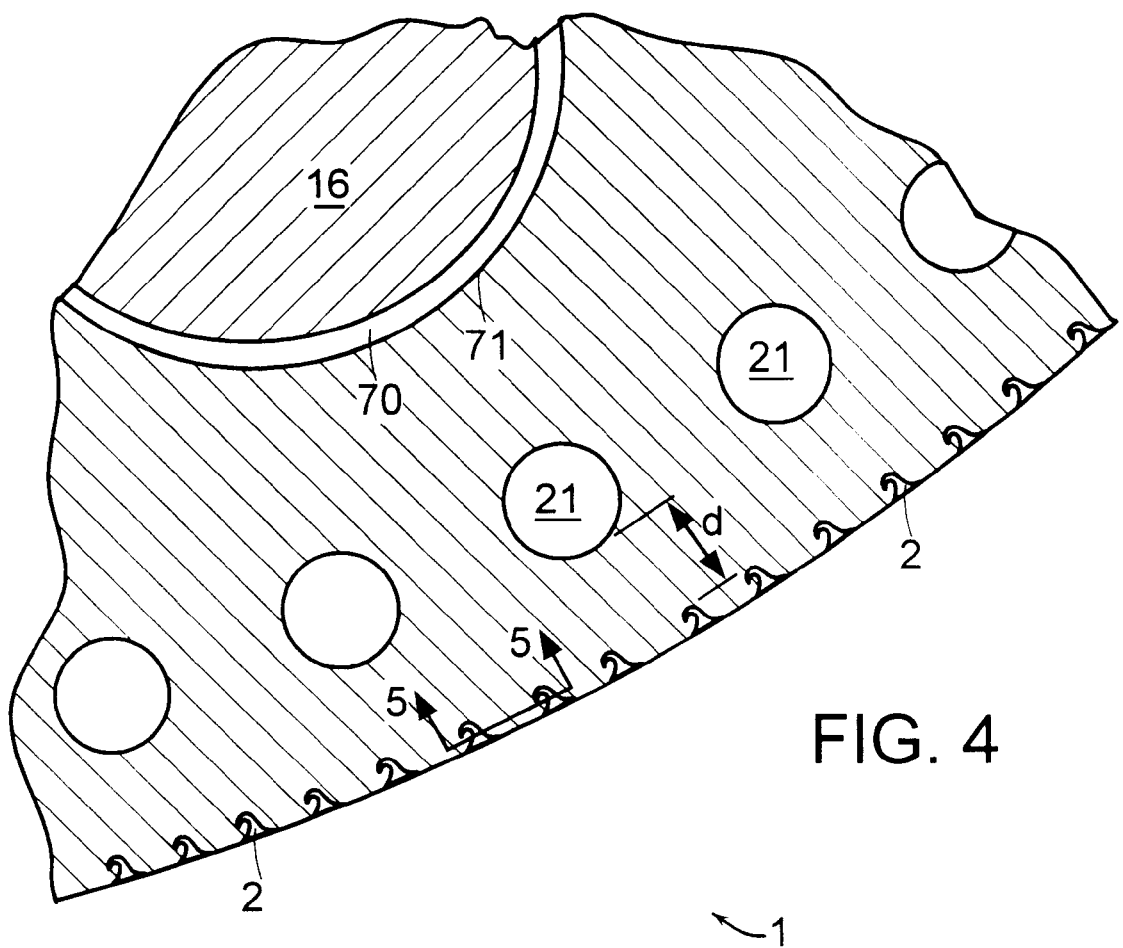
FIG. 4 is an enlarged view of area 4 in FIG. 3.

Referring to FIG. 4, the mold cavities 2 near the periphery of mold roll 1 are shaped to form fastener elements integral to a base sheet. These mold cavities 2 form features of about 0.005 to 0.100 inch in height, and on the order of 0.005 to 0.100 inch wide. For improved cooling, coolant holes 21 are in close proximity to mold cavities 2, within a distance d of, for instance, 0.2 inch. Also visible in this view is a gap 70 between tie rod 16 and the wall of an associated hole 71 through the mold roll. This gap enables improved mold ring alignment, as will be discussed later.

Figure 5:
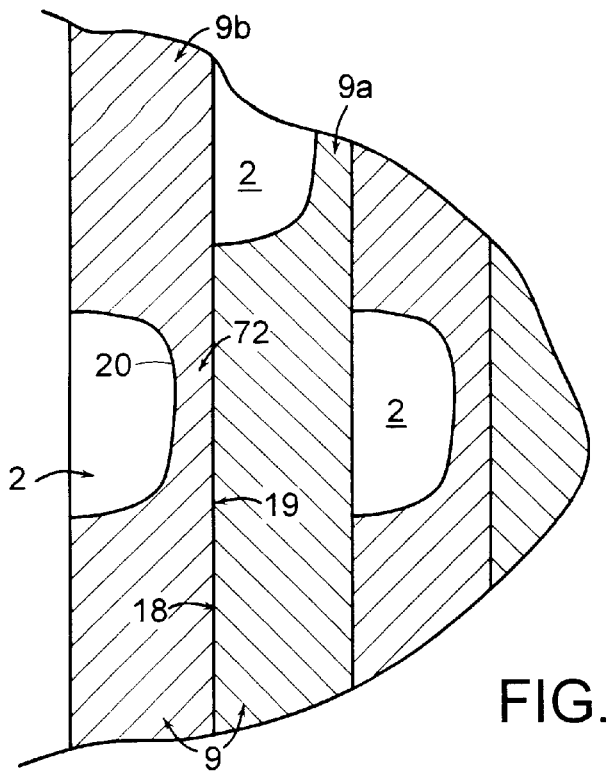
FIG. 5 is an enlarged cross-sectional view, taken along line 5—5 in FIG. 4.

As seen in FIG. 5, in certain circumstances mold cavities 2 are formed such that they do not extend through the entire thickness of a mold ring 9. With the mold cavities thus formed, mold rings 9 are stacked directly against one another, with the open surface 18 of one ring, for instance ring 9a, against the closed surface 19 of the next ring, for instance ring 9b, which forms a side of the mold cavities in ring 9a.

Figure 5A:
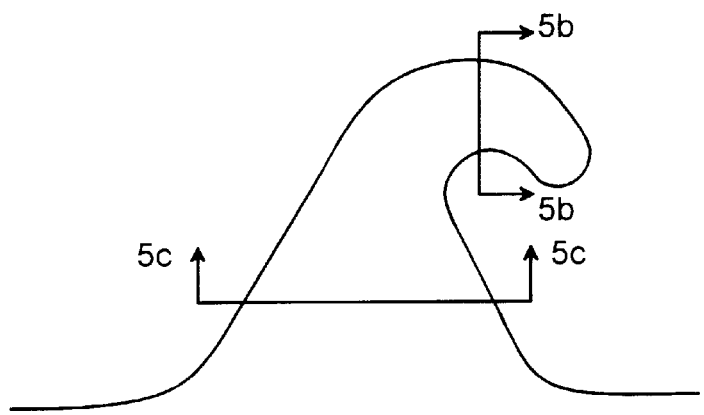
FIGS. 5A through 5C are enlarged views of a preferred embodiment of a hook feature formed by a cavity of the mold roll.
Figure 5B:
Figure 5C:

An advantage of forming mold cavities 2 such that they do not extend through the thickness of mold ring 9 is that they may be used to form features with at least one curved side, formed by a concave surface 20. The resulting tapered and convex nature of the hooks, as shown in FIGS. 5A through 5C, can contribute to the penetrability of the hooks into shallow loops, such as presented by non woven fabrics. In the case of extremely small hooks in close rows, the portion 72 of the mold ring that functions as a spacer between rows of hooks adds thickness to the ring and makes it easier to handle during fabrication and assembly.

In other embodiments (not shown), the mold cavities extend through the thickness of the mold rings. In these configurations, spacer rings void of mold cavities are stacked between mold rings to enclose the mold cavities that are otherwise defined in the mold rings. In yet another embodiment, mold cavities are formed on both sides of some mold rings, the array of mold cavities on the two sides of the ring being circumferentially offset to avoid interference between mold cavities on mating rings. In another preferred embodiment a mold cavity for a given feature is formed by accurately aligned cavity portions in two or more mold rings to form a single mold cavity.

Figure 6:
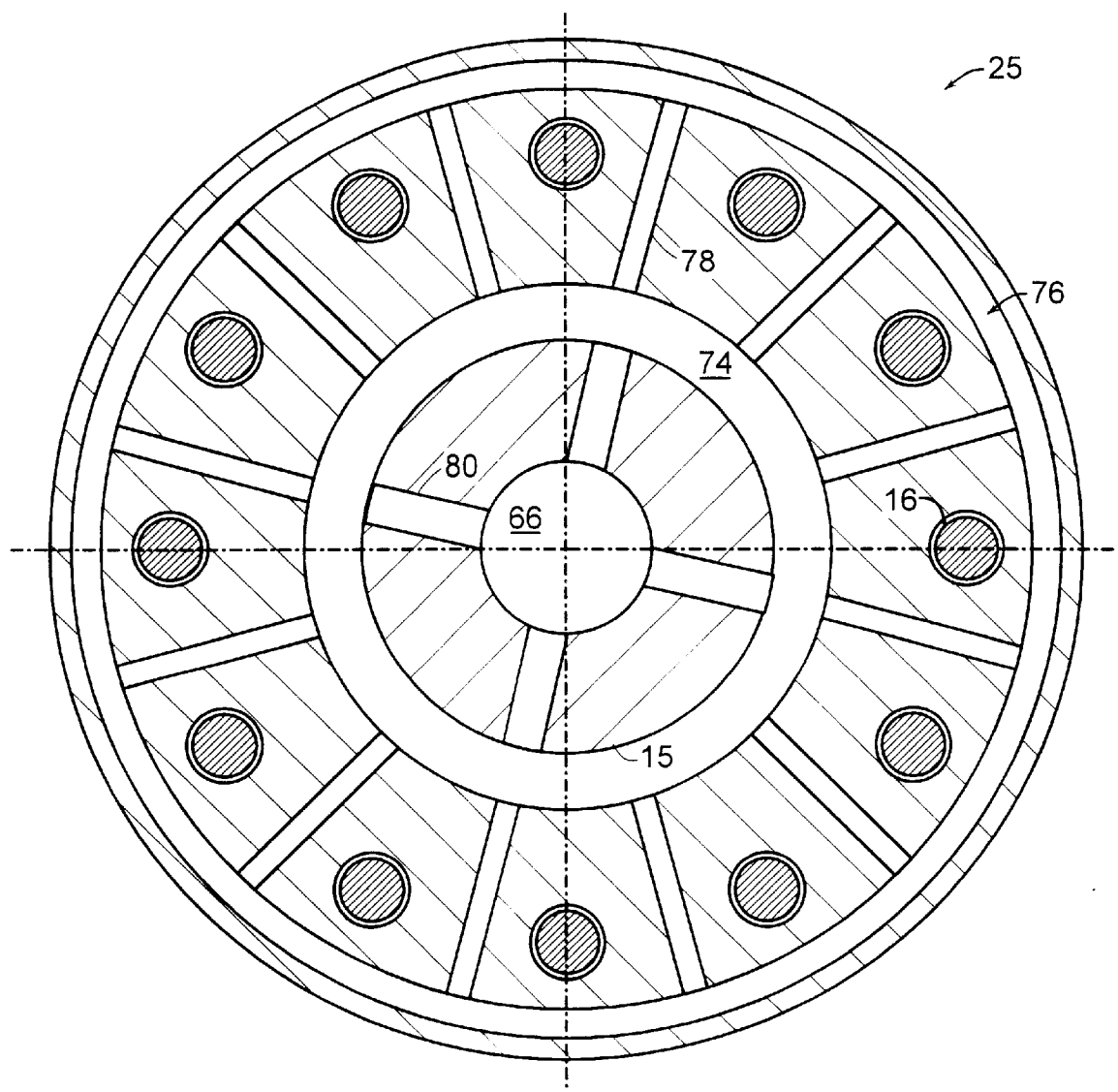
FIG. 6 is an enlarged cross-sectional view, taken along line 6—6 in FIG. 2.

Referring to FIG. 6, the ring-facing side of exhaust manifold 25 has an inner and an outer recess, 74 and 76, respectively, connected by several radial grooves 78. Recesses 74 and 76, and grooves 78, form a hydraulic passage (e.g. 64 in FIG. 2) to hydraulically connect the coolant passages in the mold rings with shaft 15. Holes 80 in shaft 15, similar to shaft holes 62 near the inlet manifold 26 (FIG. 2), enable coolant to flow from inner manifold recess 74 to return passage 66.

Figure 7A:
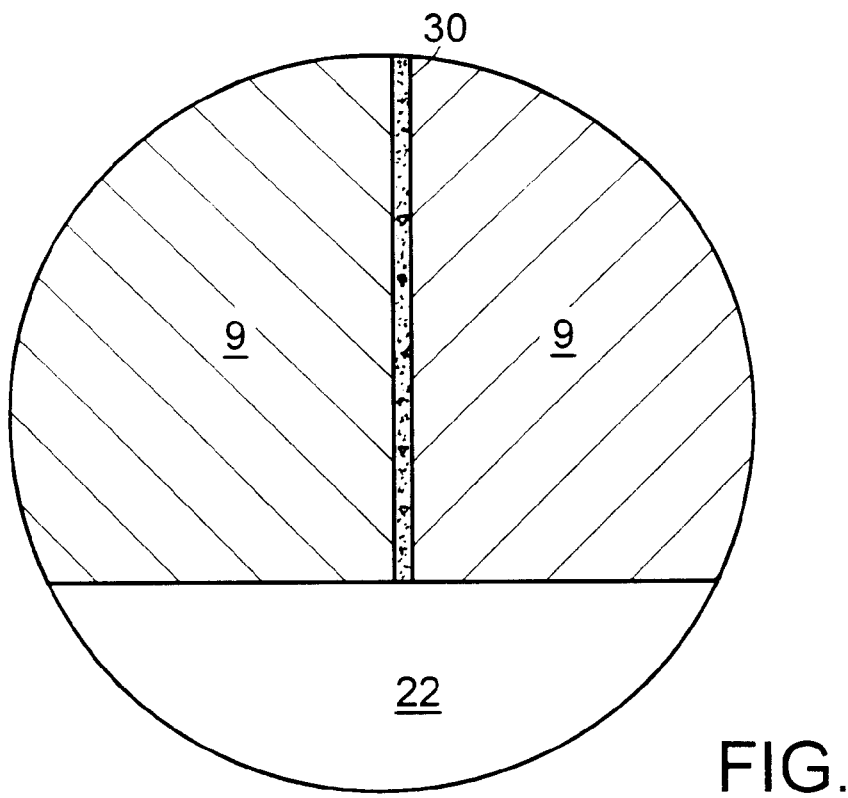
FIGS. 7A through 7C are enlarged views of preferred embodiments of area 7 in FIG. 2.
Figure 7B:
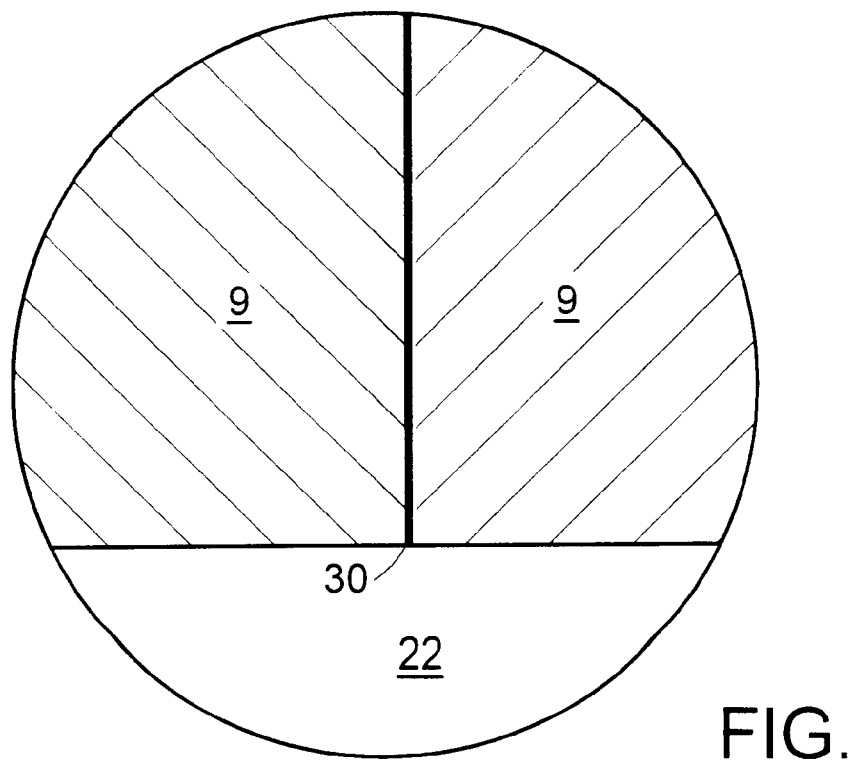

Referring to FIGS. 7A and 7B, sealant material 30 is employed to contribute to sealing cooling passages 22 within mold rings 9 in a preferred embodiment. Sealing is augmented by axial compression of the mold roll by the tie rods. In a presently preferred embodiment, sealant 30 is placed along the surfaces of mold rings 9 before assembly, as shown in FIG. 7, and is compressed by the axial compression of the mold roll. In another embodiment (FIG. 7B), the sealant is fluid-deposited, e.g. as carried by automobile radiator repair fluid, by the leakage of coolant into any interstitial space between mold rings 9 near coolant passages 22. Sealant material 30 is also placed at each end of the stacked roll of mold rings 9, near the location of tie rods 16 and shaft 15, to seal against leakage from manifolds 25 and 26 (FIG. 2). Use of a hydrophobic material as sealant 30 helps to restrict the migration of water-based coolant between the mold rings.

Figure 7C:
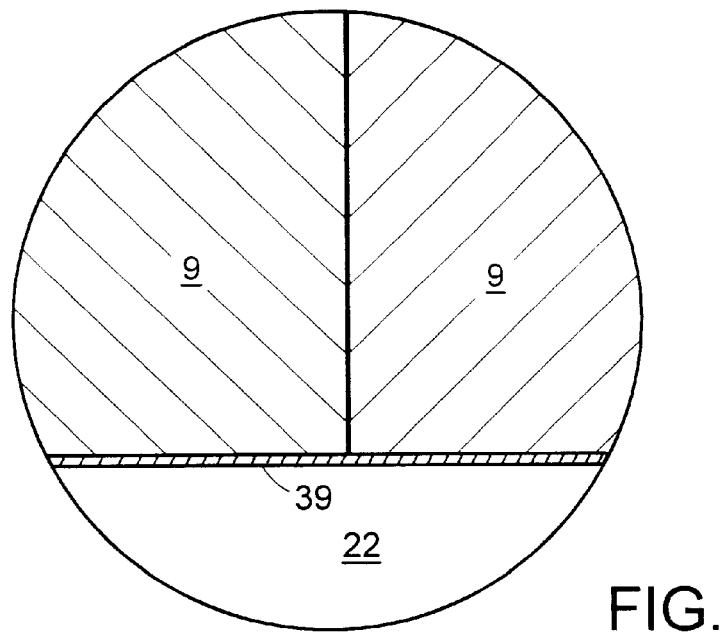
Figure 8:
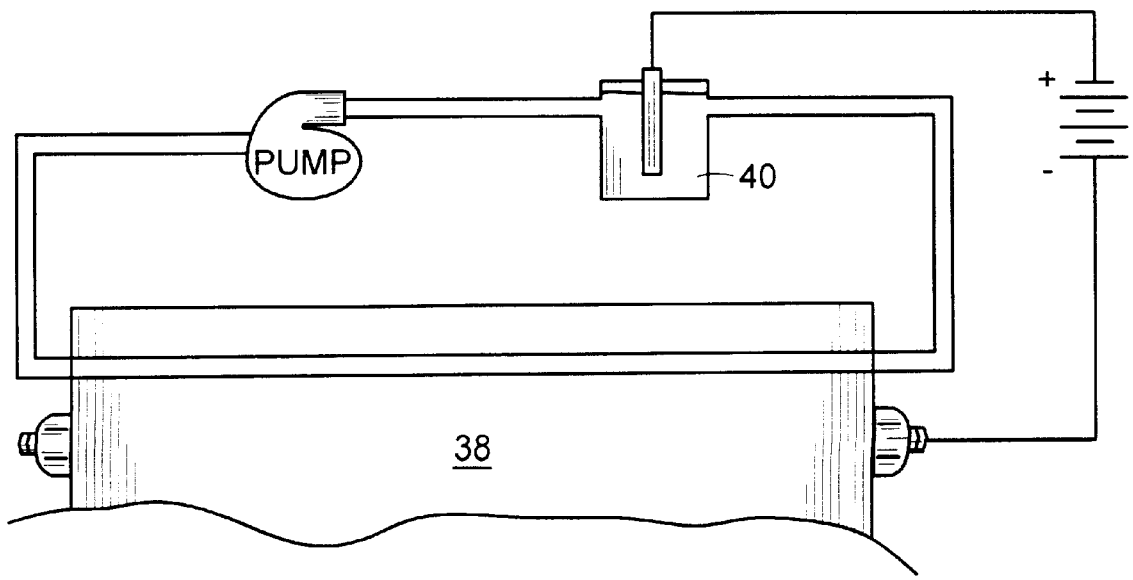
FIG. 8 is a schematic view illustrating a process for forming the structure of FIG. 7C.

Referring to FIG. 7C, in another embodiment of the invention a thermally conductive material 39 is deposited on the surface of the cooling passages 22, and acts as a sealant to keep the coolant from leaking between mold rings 9. This conductive material may be deposited in an electroplating process as shown in FIG. 8 after the mold rings 9 are stacked together and compressed. In the electroplating process, the compressed stack 38 of rings serves as one electrode as electroplating fluid 40 is circulated through the cooling passages 22. In this manner a layer of plating material (e.g. thermally conductive material 39) is deposited along the surface of cooling passages 22. Sufficient axial compression of stack 38 during this process, along with an appropriate viscosity of fluid 40, keeps the fluid 40 from migrating between the mold rings, although a small amount of migration of fluid 40 between rings 9 is not adverse to the function of the assembled mold roll.

Although not shown, other seals are also employed as required to maintain the integrity of the cooling system, such as static seals at the interfaces of manifolds 25 and 26 to shaft 15 and to the stack of mold rings, and dynamic seals between the ends of shaft 15 and the stationary plumbing.

Figure 9:
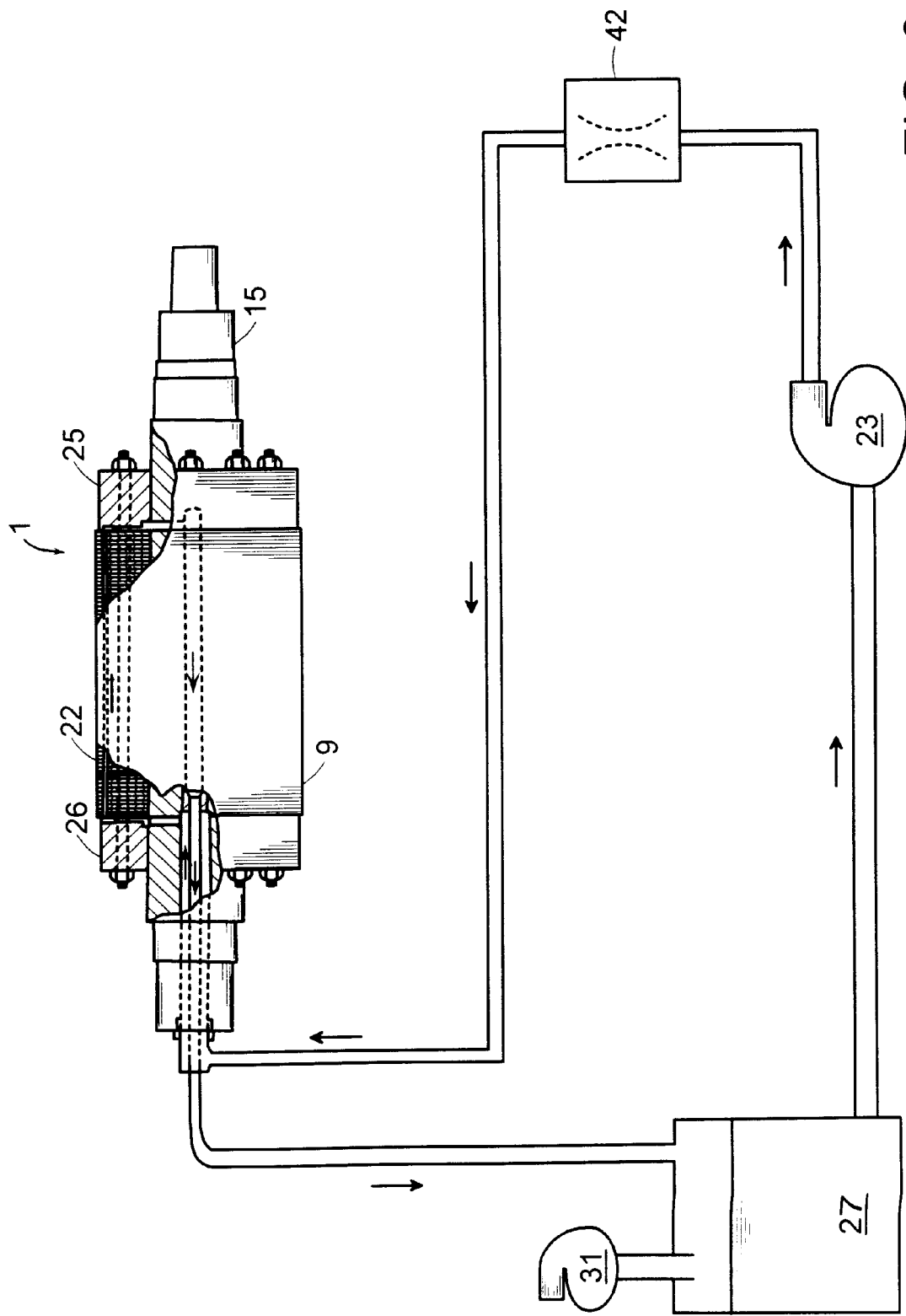
FIG. 9 is a schematic illustration of a cooling system.

Referring to FIG. 9, coolant is circulated through the cooling system by a pump 23, and flows into mold roll 1, through inlet manifold 26 in communication with all of the cooling passages 22, along cooling passages 22, through outlet manifold 25, into shaft 15 and back to a cooling reservoir 27. To reduce the effect of any leaks between the mold rings, in certain preferred embodiments the coolant system incorporates a vacuum source 31 and/or other means, including an upstream flow restriction 42, to maintain a subatmospheric pressure within cooling passages 22.

Figure 10A:
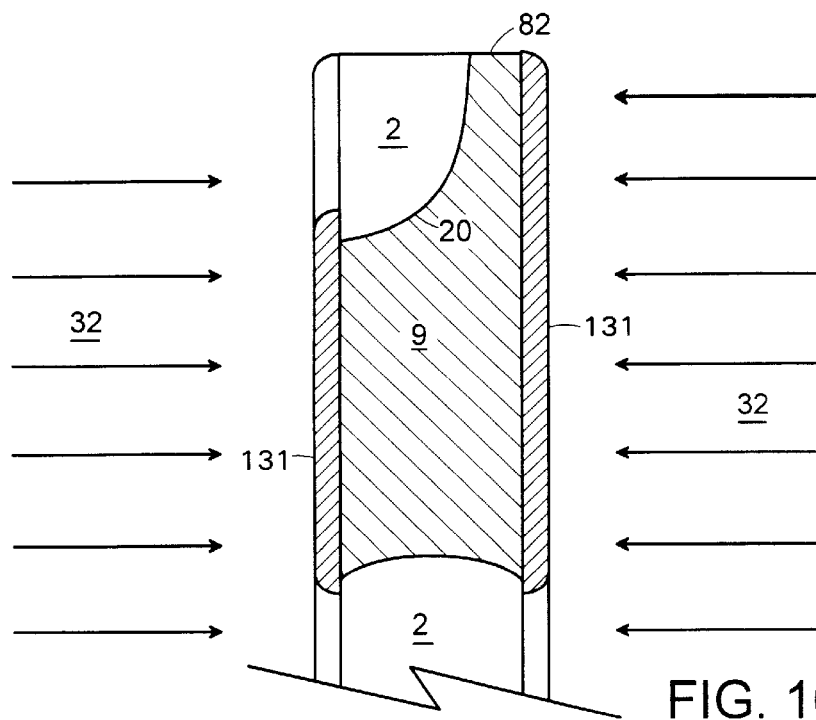

Referring to FIG. 10A, in certain preferred embodiments a photochemical (PC) etching process is used to form mold cavities 2, coolant passages 22, and other features, such as an alignment keyway for key 41 (FIG. 3). In the embodiment illustrated, mold cavities 2 do not extend through the thickness of mold ring 9. In the ring fabrication process, an etch-resistant photoresist material 31 is fixed to the surfaces of a sheet 82 of mold ring material of the proper thickness and then developed by exposure to ultraviolet light through a mask (not shown) that is cut to produce the desired final surface configuration, including preferably the finished inner and outer diameters of the mold ring. The undeveloped photoresist material in areas beneath the mask remains fixed to the sheet as the developed material 31 is removed. Etching fluid 32 is then sprayed on the surfaces of the sheet, etching the areas not covered by etch-resistant material 31. When the etching process is complete, material 31 is removed from the finished mold ring 9. As a natural result of the PC etching process the etching rate is slower at the bottom of the mold cavity, due in part to the dilution of the etching fluid, thus creating a concave surface 20 at the bottom of molding cavity 2, and useful undercuts (not shown) in some arrangements.

In other preferred embodiments, especially those involving large hook elements and other features, the mold cavities are formed with PC techniques by etching through the thickness of the sheet, either from one side or by etching through both sides.

An advantage of the PC process is that all of the features on a mold ring 9, including the inner and outer diameters, coolant holes 21 and mold cavities 2, can be advantageously produced at the same time or in an appropriate sequence, using precisely positioned masks in accordance with general photo-lithographic techniques, as employed e.g., in the semiconductor industry. In some cases, for instance, one side of a sheet of mold ring stock is appropriately masked to etch all of the features to the depth of the mold cavities 2, and the other side of the sheet is masked by a system that holds registration to complete the etching of the inner and outer diameters and coolant holes 21 through the thickness of mold ring 9.

Figure 10B:
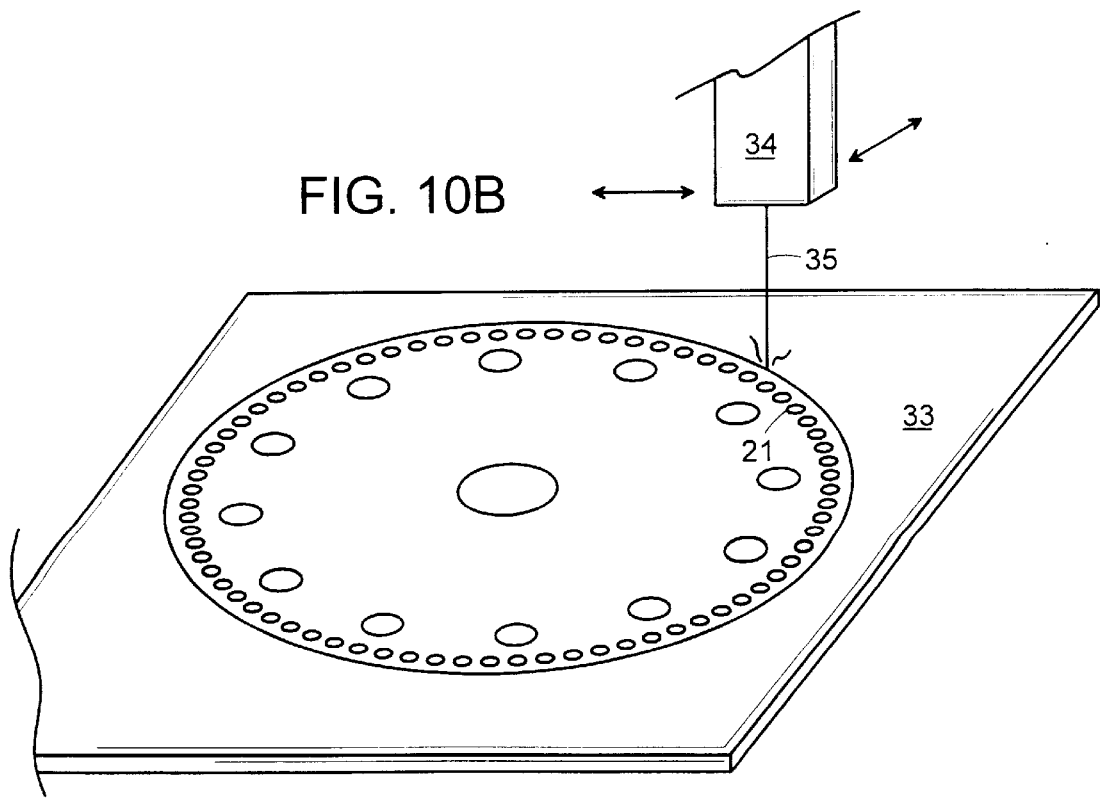

Referring to FIG. 10B, a laser machining technique is employed in other embodiments to produce mold rings 9 from a sheet 33 of ring stock. Using the laser machining process, hook profiles cut through the thickness of sheet 33 are readily formed, and these can be advantageously of smaller size than those previously formed using wire EDM methods. For instance, hook elements as short as 0.005 to 0.008 inch, with appropriately small radii of 0.001 or 0.002 inch, can be formed. To produce a mold ring by the laser machining process, sheet 33 of the proper thickness is fixtured to be presented to a laser head 34. A beam 35 of energy from laser head 34 removes material from sheet 33, according to a programmed pattern, to produce a finished mold ring. Head 34 is typically mounted on a positionable base, such that the motion of the head can be controlled as desired to form the features of the finished ring. Transverse X-Y motion of a table carrying sheet 33 may also be employed. The depth of the groove produced by the effect of the beam 35 on the sheet 33 is a function of the intensity or power of the beam 35, the material properties of the sheet 33, and the speed at which the head 34 or sheet 33 is moved. Varying these parameters can produce the desired depth of the mold cavities, while also cutting through the entire thickness of the sheet to form the coolant holes 21, the holes 71 for the tie rods, and the ring inner and outer diameters. In the case where a through-cut is not desired, particularly close control of the deposition of laser energy is maintained to limit the vaporization of the ring material to produce, for example, the general cavity shape of FIGS. 5A, 5B and 5C.

Referring to FIG. 11, the structure of the mold roll enables an improved mold ring alignment method, using a radial alignment shell 36 and one or more orientation bars 37. Preferably, the rings are sequentially stacked about shaft 15 which is concentrically aligned to shell 36 by the inlet and outlet manifolds (i.e., 25) or other means. Tie rods 16 (or other alignment bars inserted through holes 71) align holes 71 as rings 9 are stacked, also aligning coolant holes 21 in each ring to form the cooling passages of the assembled roll. Particularly useful in the assembly of a mold roll for the production of fastener products with good base thickness consistency, the inner surface 37 of shell 36 aligns the outer surface of the rings, such that the assembled roll has a very cylindrical circumference for producing an even base thickness in the molded fastener product. In addition, the stack of rings is concentrically aligned with shaft 15. The gap (70, FIG. 4) between tie rods 16 and the inner edges of holes 71 enables each ring to be radially aligned by surface 37 of shell 36 without radial restraint from tie rods 16. After rings 9 are stacked, the other manifold is set in place and the stack 38 is compressed and removed from alignment shell 36.

In an alternative embodiment (not shown), the rings are aligned with an expandable center shaft.

Among the advantages of the improved cooled mold roll and methods of manufacture of the present invention, as relates to the production of strip-form plastic products, is that the invention enables faster production rates and therefore lower unit production costs, more accurately formed products, and products with finer features and higher flexibility of the supporting base layer.

In molding machines that employ substantially the Fischer process, other systems from that shown in FIG. 1 may introduce pressurized heat softened or molten synthetic resin to the surface of the mold roll under conditions that fill the mold cavities and form a base layer integral with features molded in the cavities. For instance an extruder may be moved closer to the roll from what is shown in FIG. 1 and the extruder nozzle may confine the resin so that it is applied with pressure directly to the mold roll, filling the cavities and forming a base layer of desired thickness. In such a configuration, the structure of the mold roll of the invention can advantageously stiffen and align the roll for improved base thickness consistency, enabling the production of thinner bases, and wider products.

FIG. 12 shows a mold roll according to the invention arranged to make a product with molded fastener elements on one side and engageable loops on the other side, in accordance with the teachings of U.S. Pat. No. 5,260,015 and U.S. Pat. No. 5,518,795, which are hereby incorporated by reference as if fully set forth herein.

FIG. 13 shows mold rolls according to the invention employed in making a so called back-to-back product in accordance with the teachings of WO 94/07556, which is hereby incorporated by reference as if fully set forth herein. In this case both mold roll 1 and pressure roll 46 are constructed and cooled in accordance with the invention. As seen in FIG. 14, both rolls have mold cavities to form features on the finished product.

In some cases sufficient cooling can be obtained in the forming area that the product is removed directly from the forming area after being carried for a short distance on the periphery of the cooled mold roll, without need for additional cooling. This may be assisted by employing cooling passages in the pressure roll 6 as well as the mold roll 1, as shown in FIG. 13.

Shown in FIGS. 15A and 15B is a fine, sharp tip fastener element formed with mold plates fabricated by the laser machining process illustrated in FIG. 10B. Elements with tips having radii, R (FIG. 15C), of about 0.001 inch or less (preferably only about 0.0005 inch), are obtainable with laser-machined molds. Certain advantages are provided by sharp tip fastener elements including penetrability into the loops of engaging loop materials. The sharp tip enables penetration between an engageable loop and the rest of the loop mass of a looped fastener member. Improving the loop-engaging probability of an individual hook of a hook fastener member increases the engagement ratio of an array of hooks, that is, the overall percentage of hooks of the array that, at any given time, engage loops. Higher engagement ratios typically result in better fastener performance.

As illustrated in FIG. 16A, the laser machining process enables the formation of mold surfaces 20 that do not extend through the entire thickness of mold plate 9. An advantage of forming mold surfaces that do not extend through the mold plate is that they may be used to form fastener elements with at least one convex surface which may contribute to the penetrability of the elements into shallow loops, such as those presented by non-woven fabrics. In this case, particularly close control of the deposition of laser energy is maintained by appropriate machine controls to limit the vaporization of the plate material to produce, for example, the concave mold surface 20 shown in FIGS. 16A and 16B.

Referring to FIG. 16B, the depth of the laser cut produced by the effect of beam 35 on sheet 33 is a function of the intensity or power of beam 35, the material properties of sheet 33, and the speed at which the laser head or sheet 33 is moved. Varying these parameters can produce either a concave mold surface of a desired depth (FIG. 16A) or can cut through the entire thickness of the sheet to form mold cavities and/or cooling holes or plate inner and outer diameters. During laser machining of mold surfaces, hot molten debris 106 of plate material is produced. A blower 108 is employed to maintain an air flow 105 sufficient to continually displace debris 106 from the forming area in the general direction indicated by arrow 102. This is especially important when forming concave surfaces not extending through the plate, as in FIG. 16B.

Fastener elements formed with these laser machined surfaces smaller than those previously formed with mold surfaces produced by wire EDM methods. For instance, small fastener elements having an overall height of 0.020 inch, or even smaller elements, for example, having a height of the order of 0.008 inch, are readily produced with cavities formed by this method. Such small hooks can be used for engaging loop materials with low-lying loops as found in non-woven fabrics.

FIG. 17A shows a mold cavity 90 formed by stacking a mold plate 9a with the laser machined surface 20 of FIG. 16A against the flat side of a spacer plate 9b. Similar cavities are also formed by stacking mold plates 9a' and 9a" together, such that their mold surfaces 20 do not overlap. This arrangement can be used to produce fastener products with particularly high densities.

In the embodiment shown in FIG. 17B, a mold cavity for a given feature is formed by accurately aligned and cooperating mold surfaces 118 and 120 in two adjacent mold plates 9c and 9d, respectively, to form a single mold cavity 114.

In FIG. 18, the hook-forming portion of an injection mold 130 for delivering moldable resin to the mold cavities is diagrammatically shown. The moldable resin is injected into adjacent mold cavities 127, thereby forming the fastener elements by injection molding. The injection mold is formed of a series of plates 122 disposed face-to-face to create a flat (or curved) surface 123 having mold cavities. The mold cavities can be formed in one or more plates. After molding, the overall mold opens, the hooks are withdrawn from the mold cavities as the molded piece is removed, and the overall mold closes for another injection cycle. Injection molding can be employed to form the hook members directly on a rigid backing which, in turn, can be attached to a separate part. Injection molding can also be employed to form the hook members integrally with a part, such that the hook members do not need to be later attached to the part.

The moldable resin may be any moldable plastic material depending upon the intended application for the fastener element. Currently, polypropylene is preferred. Nylon, polyesters, polyethylene, propylene, polyethylene and copolymers thereof, or other thermoplastic resins, may also be used.

With laser machining methods, mold surfaces can be cut through the thickness of a mold plate at speeds of up to one circumferential inch per minute. A finished mold plate can typically be machined in less than one hour. In applications when close control of the cavity surface depth is desired, a pulsed laser is preferred.

To provide very smooth surface finishes on laser-machined mold surfaces, such that the solidified hooks are more readily released, the laser-machined mold plates are immersed in a chemical etchant which preferentially removes mold plate material of the microscopic asperities left by the laser-machining process. Finished mold surfaces with a roughness of 63 microinches, for instance, have been found to acceptably release molded fastener elements.

The embodiments are within the scope of the claims. For instance, mold surfaces can be formed on both sides of some mold plates, the array of mold cavities on the two sides of the plate being circumferentially offset to avoid interference between mold cavities on mating plates. Multiple mold plate blanks can also be stacked together, with features extending through the thickness of the plates laser-machined simultaneously through all stacked plates. These and other features and advantages will be understood from the following claims, taken in conjunction with the foregoing specification and accompanying drawings.

What is claimed is:

1. A mold plate formed from flat plate stock, having an array of laser-cut mold surfaces at an edge of the mold plate for forming, together with cooperating surfaces, molding cavities shaped to form respective molded fastener elements of a touch fastener product, at least many of the mold surfaces each forming a point, extending into material of the plate, having a radius of less than about 0.001 inch.

2. The mold plate of claim 1 having coolant holes extending through the thickness of the mold plate.

3. The mold plate of claim 1 having a thickness of less than about 0.020 inch.

4. The mold plate of claim 1 wherein said mold surfaces are concave and extend through only a portion of the thickness of the mold plate.

5. The mold plate of claim 1 wherein said mold surfaces forming said points extend fully through the thickness of the mold plate.

6. A mold plate, formed from flat plate stock, having an array of laser-cut mold surfaces at a peripheral edge of the mold-plate, and laser-cut coolant holes at locations spaced from said edge, said mold surfaces and coolant holes extending fully through the thickness of the mold plates, at least many of the mold surfaces each forming a point, extending into material of the plate, having a radius of less than about 0.001 inch.

7. The mold plate of claim 1 wherein said many of the mold surfaces are shaped to form fastener elements for touch fasteners, said radius defining an end radius of a fastener element feature.

8. The mold plate of claim 7 wherein said mold surfaces form hook-shaped molding cavities.

9. The mold plate of claim 1 wherein said radius is less than about 0.0005 inch.

10. The mold plate of claim 1 further defining an array of mounting holes and an array of coolant holes, the coolant holes being of smaller diameter than, and of closer proximity to the mold surfaces than, the mounting holes.

11. The mold plate of claim 1 of circular form, said edge forming a circumference of the mold plate.

12. The mold plate of claim 11 having a thickness of less than about 0.020 inch and a diameter on the order of 8 to 12 inches.

13. The mold plate of claim 4 defining said mold surfaces on both of two broad sides thereof.

14. The mold plate of claim 1 wherein said mold surfaces have a surface roughness of about 63 microinches.

15. A flat mold plate having a thickness of less than about 0.020 inch and defining an array of mold surfaces shaped to form respective molded fastener elements of a touch fastener product, the mold surfaces located at a peripheral edge of the mold plate, at least many of the mold surfaces each defining a point, extending into material of the plate, having a radius of less than about 0.001 inch for forming a sharp tip of a fastener element.

16. The flat mold plate of claim 15 of circular form, the array of mold surfaces spaced along a circumferential edge of the mold plate.

17. The flat mold plate of claim 15 wherein the mold surfaces are shaped to form hook-shaped fastener elements, each hook-shaped fastener element having a sharp distal tip.

18. The flat mold plate of claim 15 wherein said mold surfaces defining said points extend fully through the thickness of the mold plate.

19. The flat mold plate of claim 15 wherein the mold surfaces are shaped to form fastener elements of less than about 0.020 inch in height.

* * * * *